United States Patent [19]

Bezner

[11] Patent Number: 4,998,395
[45] Date of Patent: Mar. 12, 1991

[54] LIGHT-TRANSMITTING WALL PANELS

[76] Inventor: Baruch J. Bezner, 124 Ibn-Gvirol Street, Tel-Aviv, Israel

[21] Appl. No.: 354,472

[22] Filed: May 19, 1989

[30] Foreign Application Priority Data

May 20, 1988 [IL] Israel ..................... 86461

[51] Int. Cl.⁵ ............................................. E04B 1/02
[52] U.S. Cl. ........................................ 52/563; 52/413;
52/574; 52/581; 428/119; 428/34
[58] Field of Search .................... 428/83, 119, 120, 34;
49/463; 52/581, 806, 413, 563, 574

[56] References Cited

U.S. PATENT DOCUMENTS

| | | | |
|---|---|---|---|
| 3,257,758 | 6/1966 | Johnson | 49/463 |
| 3,529,394 | 9/1970 | Wilkins | 52/806 X |
| 3,771,748 | 11/1973 | Jones | 52/806 X |
| 4,168,067 | 9/1979 | Wiczer | 248/221.4 X |
| 4,299,070 | 11/1981 | Oltmanns et al. | 52/309.11 |
| 4,439,969 | 4/1984 | Bartlett | 52/461 |
| 4,573,300 | 3/1986 | Bezner | 52/581 X |
| 4,736,563 | 4/1988 | Bilhorn | 52/460 |
| 4,790,112 | 12/1988 | Wang | 52/460 |

FOREIGN PATENT DOCUMENTS 0050462  4/1982  European Pat. Off. .
814250   6/1959  United Kingdom ................. 428/34

Primary Examiner—Henry F. Epstein
Attorney, Agent, or Firm—Benasutti, P.C.

[57] ABSTRACT

An extruded, modular panel unit, made of at least two sheet-like major surfaces inter-connected and spaced apart by a plurality of ribs dividing the space delimited by the major surfaces into a plurality of subspaces, and at least two pairs of spaced-apart, ridge-like joining projections extending in direction of extrusion, the two pairs of projections being located at one edge of the panel units. The joining projections rise from an outside face of one and the same major surface and point in the same direction, and in assembly the outside surfaces of the outer projections of the pairs of projections are in substantially direct contact with similar surfaces of coplanarly adjacent panels.

10 Claims, 3 Drawing Sheets

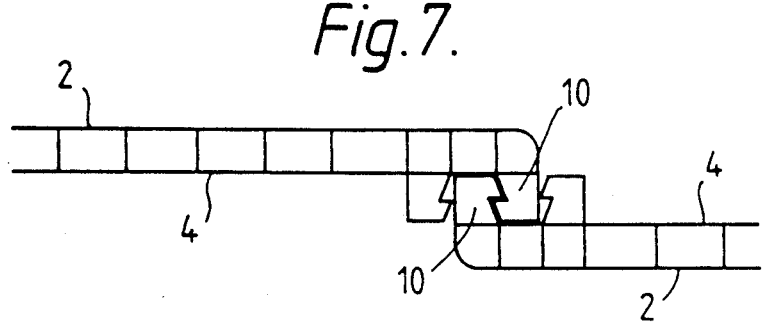
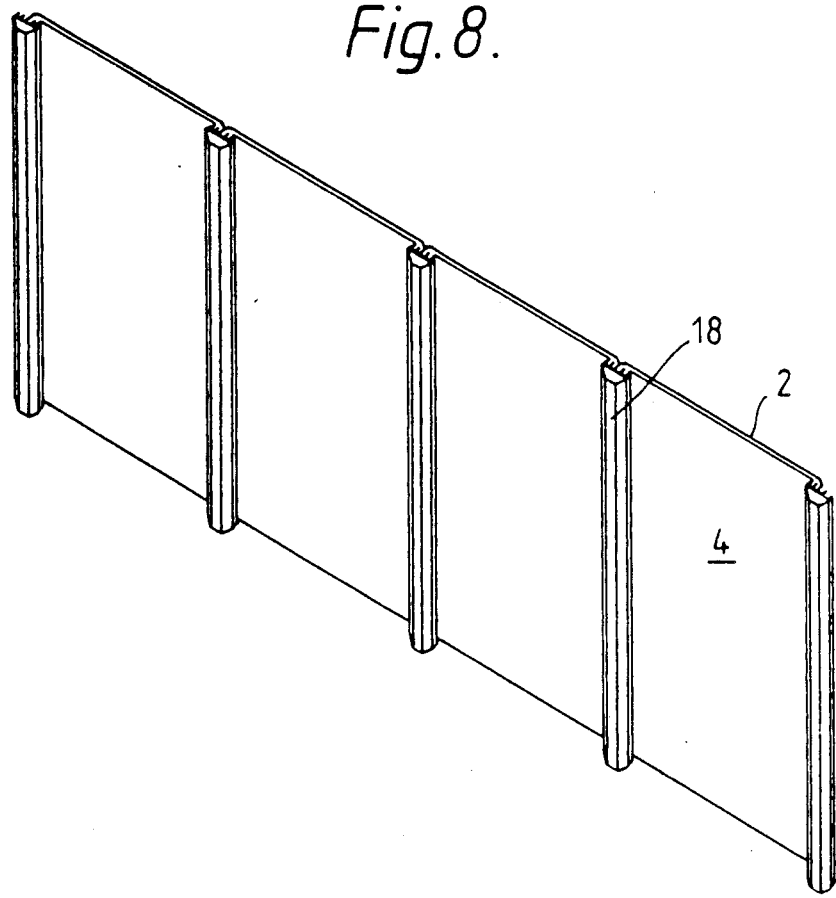

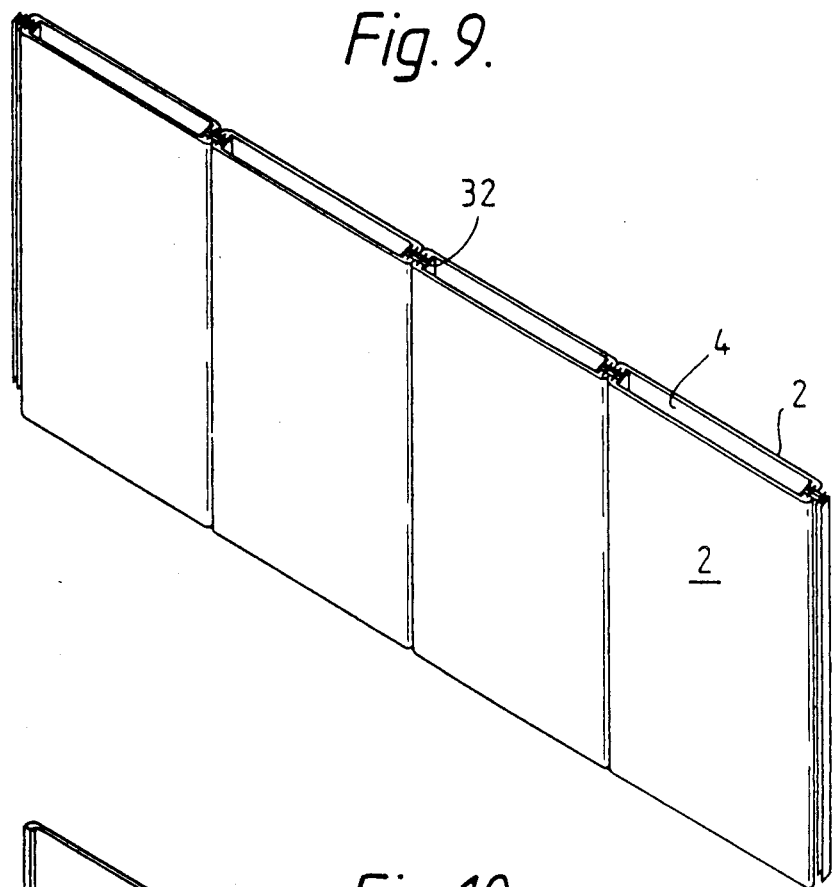
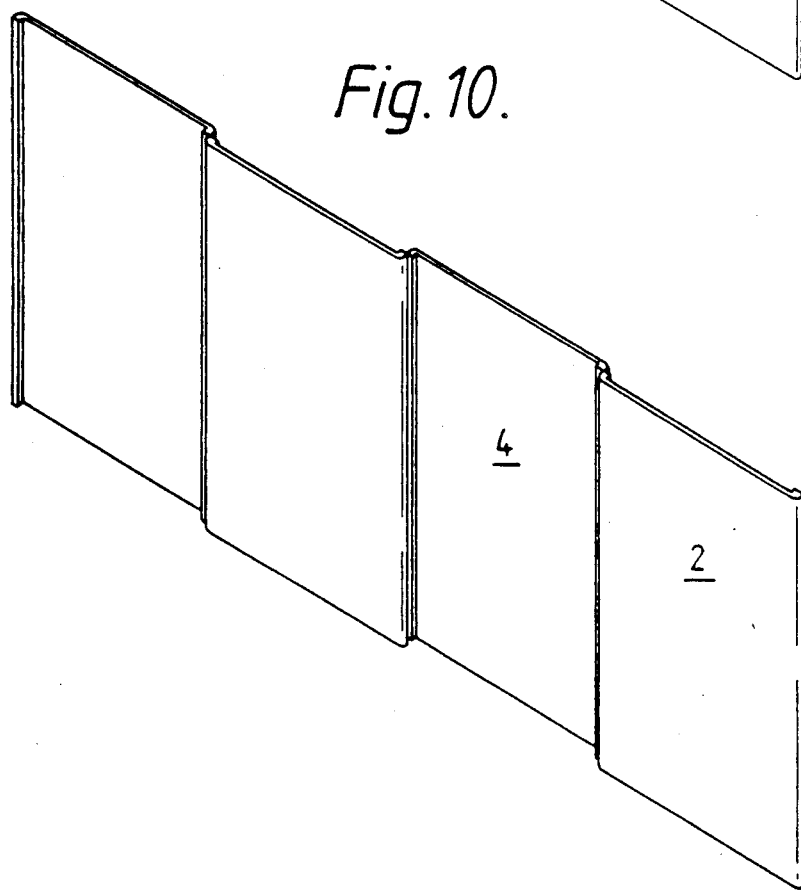

LIGHT-TRANSMITTING WALL PANELS

The present invention relates to an extruded modular panel unit for the construction of wall sections, particularly of light-transmitting sections such as windows, walls, roofs, etc., especially in industrial structures.

There are known extruded panels having integral flanges at their edges, which flanges serve to assemble a plurality of such panels to form larger surfaces. Such panels are described and claimed in European Patent 0,050,462.

In order to obtain the required mechanical strength for both the panels themselves and the joints which are realized with the aid of special joining members), these flanges must have an appreciable height. Such a height, however, materially increases the stacking volume of the panel units prior to their assembly, substantially increasing storage as well as shipping costs.

According to the present invention there is now provided a modification of the panels disclosed in the above patent.

The panels of the present invention, while falling within the scope of the claims of the above patent were not previously described in said patent and constitute an improvement thereon.

According to the present invention there is provided an extruded, modular panel unit, comprising at least two sheet-like major surfaces inter-connected and spaced apart by a plurality of ribs dividing the space delimited by said major surfaces into a plurality of subspaces, and at least two pairs of spaced-apart, ridge-like joining projections extending in direction of extrusion, said at least two pairs of projections being located at one edge each of said panel units, wherein said joining projections rise from an outside face of one and the same major surface and point in the same direction, and wherein in assembly the outside surfaces of the outer projections of said pairs of projections are in substantially direct contact with similar surfaces of coplanarly adjacent panels.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 7 illustrates a joint between two adjacent panels without use of a joining member;

FIG. 8 is a schematic drawing, in perspective, of a "single-pane" structure produced by joining four panels by means of the joining members of FIG. 3;

FIG. 9 is a schematic drawing, in perspective, of a "double-pane" structure produced by joining four panels by means of the joining members of FIG. 5; and FIG. 10 is a similar drawing, illustrating a single-pane structure in which the panels have been joined as shown in FIG. 7.

Figure 1:
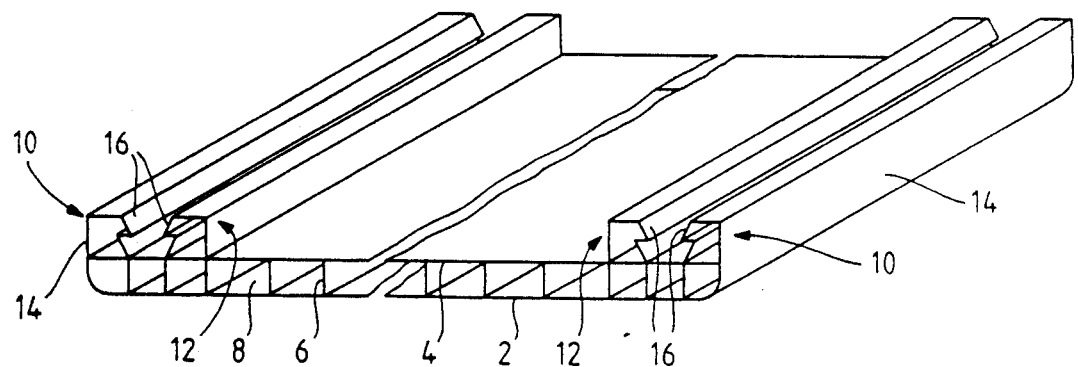
FIG. 1 shows a partial, perspective view of the panel unit according to the invention.

Referring now to the drawings, there is seen in FIG. 1 a cross-sectional view of a preferred embodiment of the panel unit according to the invention, showing two sheet-like major surfaces 2 and 4 interconnected and spaced by a plurality of ribs 6, which ribs divide the space delimited by the two major surfaces 2 and 4 into a plurality of subspaces 8.

Figure 2:
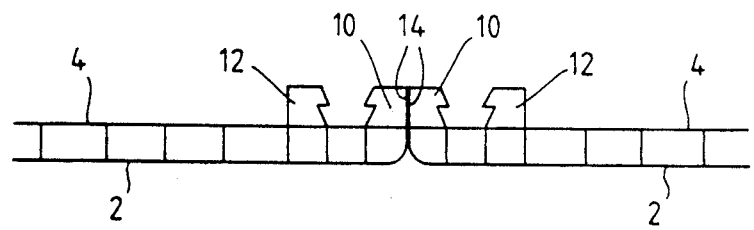
FIG. 2 is a partial, cross-sectional view of two adjacent panel units ready for joining.
Figure 4:
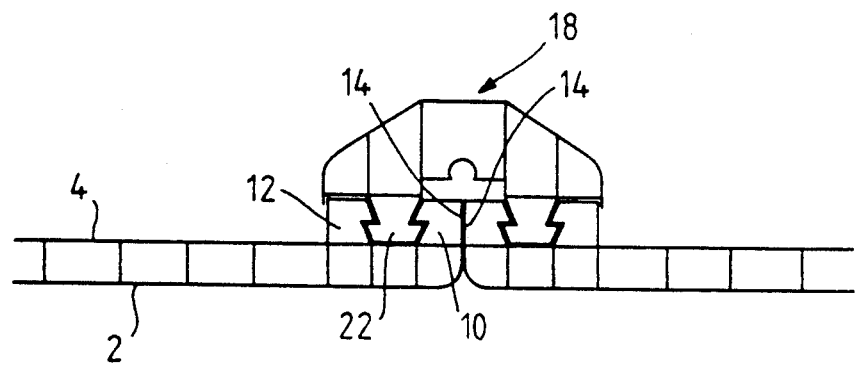
FIG. 4 represents the two panel units of FIG. 2 as joined by the joining member of FIG. 3.

Extending in direction of extrusion, there is provided at each of the panel edges, a pair of relatively low, ridge-like, spaced-apart joining projections 10, 12 rising from the major surface 4 in a direction substantially perpendicular thereto. The outside surfaces of the projections 10 constitute the proper edges of the panel unit and, in at least some of the panel assembly modes envisaged, are adapted to make contact with the outside surfaces 14 of the projections 10 of adjacent panel units, as seen in FIGS. 2 and 4. The inside surfaces of the projections 10, 12, i.e., the surfaces facing one another, are provided with tooth-like detent means 16, the precise function of which will become apparent further below.

While in the preferred embodiment described the outside surfaces 14 of the projections 10 are smooth, it is also possible to provide them with serrations extending in the direction of extrusion. This would improve the sealing properties of the joint and also provide a positive alignment during, and additional safety after, the application of the joining member 18.

Figure 3:
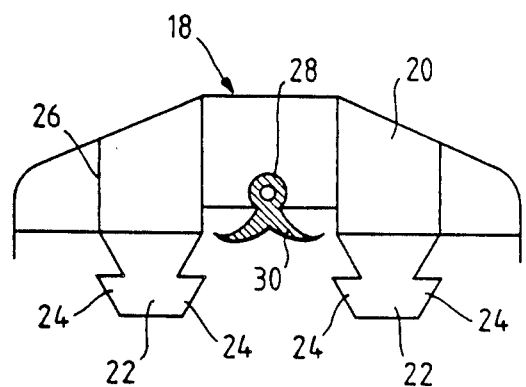
FIG. 3 is a cross-sectional view, enlarged relative to FIG. 2, of a first embodiment of a joining member according to the invention.

The latter is shown in cross section in FIG. 3, and is in the form of a hollow, extruded element comprising a base portion 20 and two rail portions 22 provided with detent means 24 engageably matching the detent means 16 of the projections 10, 12 of the panel units. The joining member 18 is stiffened by reinforcing ribs 26. Also seen is a channel 28 extending in direction of extrusion and adapted to accommodate a sealing strip 30 shown in dash-dotted lines and advantageously used whenever ambient conditions demand proper sealing. Channel 28 is also useful as compensating element for thermal expansion and contraction.

Joining the panels is carried out in the following way: Two panels to be joined are brought into a position of alignment as shown in FIG. 2, after which the rails 22 of the joining member 18, facing the paired projections 10, 12, are pushed into the spaces between the respective projections 10, 12 as far as they will go or, in other words, are pushed over the contacting projections 10. It is seen that the detent means 24 and 16 are shaped and oriented in such a way as to facilitate application of the joining member 18 (under slight elastic deformation of the elements involved), while offering resistance to its removal.

FIG. 4 shows two fully joined panels, with the joining member 18 in the applied position, while FIG. 8 schematically shows a window pane comprised of four joined panels.

While the above-described "single-pane" embodiment gives satisfactory service under most environmental conditions, the maintaining, with a minimum of losses, of particularly high temperature differentials might require still better insulation.

Figure 5:
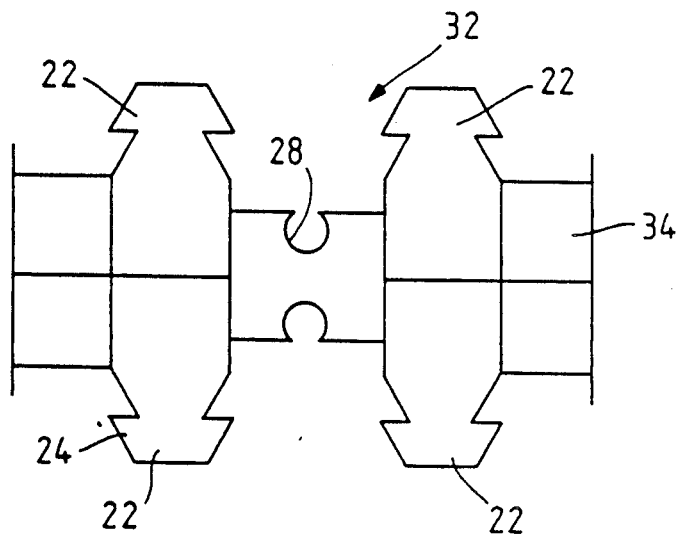
FIG. 5 is a cross-sectional view of a second embodiment of the joining member according to the invention.
Figure 6:
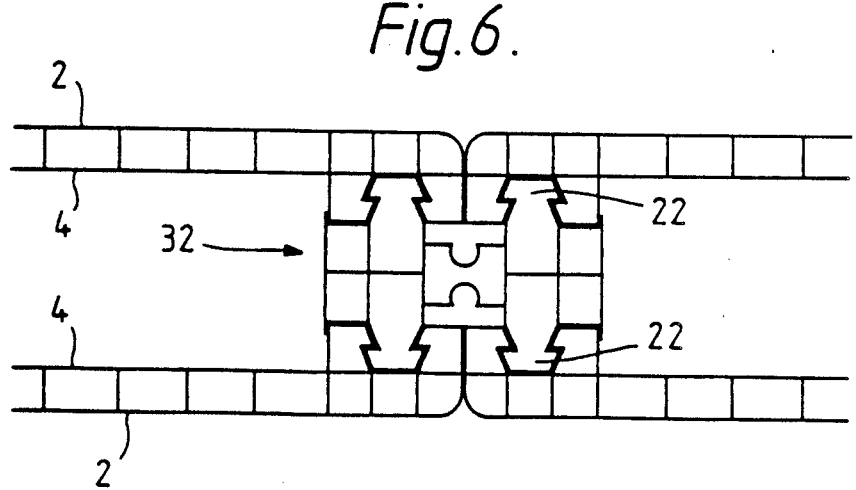
FIG. 6 shows a partial view, in cross section, of the "double-pane" window producible with the aid of the embodiment of FIG. 5.

Such superior insulation is provided by a "double-pane" structure, using the panels according to the invention, in conjunction with another embodiment of the joining member 32. This embodiment, shown in FIG. 5, is in the form of a hollow extrusion, essentially constituted by two joining members 18 placed back to back, and consisting of a body portion 34 and four rail portions 22, each with its detent means 24 which, in shape and function, are identical to those of the embodiment illustrated in FIG. 3. Also provided are channels 28 for sealing means. FIG. 6 shows such a twin joining member 32 in the applied position, while FIG. 9 schematically represents a "double pane" window structure comprised of four pairs of panels.

Due to the design of the joining portion, i.e., the spaced-apart joining projections 10, 12 of the panel unit according to the invention, panels for some low-stress applications can also be assembled without the use of joining members 18. Such a joint is shown in FIG. 7, and a structure assembled according to this configuration can be seen in FIG. 10. From FIG. 7 it is obvious that joining is effected by pushing the projection 10 of each of the adjacent panels into the space between the spaced-apart projections 10, 12 of the other panel, until the detent means 16 and 24 engage with one another. Panels assembled in this manner are obviously not coplanar, which has an interesting aesthetic effect.

The panels according to the invention are easily flexed and can therefore be used to form, at the construction site, arched roofs, skylights, etc.

While in the embodiments shown in the drawings, the ribs 6 (FIG. 1) are perpendicular to the major surfaces 2, 4, other rib configurations, too, are possible, such as zigzag, sawtooth, honeycomb, Y, etc. etc.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In an extruded, modular panel unit for the construction of wall-surface portions, including light-transmitting wall-surface portions, comprising at least two sheet-like major surfaces interconnected and spaced apart by a plurality of ribs dividing the space delimited by said major surfaces into a plurality of subspaces, and having joining flanges extending in the direction of extrusion at each extruded edge of one major surface of said panel unit, the improvement wherein said joining flanges comprise:

a pair of parallel spaced-apart projections, each projection having a detent on an inside surface thereof which faces the opposite projection of the pair, said detents of the pair cooperating to provide a detent means for locking said panel unit coplanarly adjacent to another identical panel unit.

2. The panel unit as in claim 1, wherein the detent means are adapted to engage a joining means adapted to be pushed over the contacting projections of coplanarly adjacent panels.

3. A panel unit as claimed in either claim 1, or claim 2 in which said detents comprise a contoured inside surface of the spaced-apart projections adapted to engage a mating contoured surface of a joining member pushed over a pair of projections on each of the coplanarly adjacent panels.

4. A panel unit as in claim 3, wherein said joining member has a plurality of rail portions having a shape adapted to engage the detents of the spaced-apart projections.

5. The panel unit as claimed in claim 1, wherein said unit is further provided with at least one, separate, joining member adapted to be pushed over and engage the detent means of the contacting projections of at least one pair of adjacent panel units, effecting the joining thereof.

6. The panel unit as claimed in claim 5, wherein said joining member is in the form of a substantially hollow extrusion comprising a base portion and two rail portions, which rail portions are provided with second detent means engageably matching said first detent means of said spaced-apart projections, both detent means being shaped and oriented in such a way as to facilitate application of said joining member, while offering resistance to the removal of said member once applied.

7. The panel unit as claimed in either claim 5 or claim 6, wherein said projections have serrated outside faces.

8. The panel unit as claimed in claim 6, further comprising a channel disposed between the two rail portions and adapted to accommodate a sealing strip and to compensate for thermal expansion.

9. The panel unit as claimed in claim 5, wherein said joining member is in the form of a substantially hollow extrusion comprising a body portion and four rail portions oppositely located on said body portion in pairs of two.

10. An extruded, modular panel unit for the construction of wall-surface portions, especially of light-transmitting wall-surface portions, comprising at least two sheet-like major surfaces interconnected and spaced apart by a plurality of ribs dividing the space delimited by said major surfaces into a plurality of subspaces, and at least two pairs of parallel spaced-apart, joining projections extending in the direction of extrusion, said pairs of projections each being located at an opposite edge of said panel units, wherein said joining projections rise from an outside face of one and the same major surface and point in the same direction, and wherein at least one of said joining projections of one pair of the panel is adapted to lockingly engage in the space between said spaced-apart projections of one of said pairs of projections of an adjacent panel.

* * * * *